United States Patent
Stremlau et al.

(10) Patent No.: US 12,480,562 B2
(45) Date of Patent: Nov. 25, 2025

(54) STRAIN RELIEF DEVICE

(71) Applicant: IGUS GMBH, Cologne (DE)

(72) Inventors: Christian Stremlau, Troisdorf (DE); Christoph Koch, Bonn (DE); Marcel Klein, Hennef (DE)

(73) Assignee: IGUS GMBH, Cologne (DE)

( * ) Notice: Subject to any disclaimer, the term of this patent is extended or adjusted under 35 U.S.C. 154(b) by 338 days.

(21) Appl. No.: 17/996,517

(22) PCT Filed: Mar. 30, 2021

(86) PCT No.: PCT/EP2021/058257
§ 371 (c)(1),
(2) Date: Oct. 19, 2022

(87) PCT Pub. No.: WO2021/213786
PCT Pub. Date: Oct. 28, 2021

(65) Prior Publication Data
US 2023/0204088 A1  Jun. 29, 2023

(30) Foreign Application Priority Data
Apr. 20, 2020 (DE) .................. 20 2020 102 173.7

(51) Int. Cl.
*F16G 13/16* (2006.01)
*H02G 3/22* (2006.01)
(Continued)

(52) U.S. Cl.
CPC .............. *F16G 13/16* (2013.01); *H02G 3/22* (2013.01); *H02G 15/007* (2013.01)

(58) Field of Classification Search
CPC ...... H02G 3/22; H02G 15/007; H02G 11/006; F16G 13/16
See application file for complete search history.

(56) References Cited

U.S. PATENT DOCUMENTS

| | | | |
|---|---|---|---|
| 4,114,043 | A | 9/1978 | Gansfried |
| 5,713,912 | A | 2/1998 | Porter |
| (Continued) | | | |

FOREIGN PATENT DOCUMENTS

| | | |
|---|---|---|
| DE | 29607172 | 6/1996 |
| DE | 29907444 | 7/1999 |
| (Continued) | | |

OTHER PUBLICATIONS

Tsubaki Kabelschlepp GMBH. "Kabelschlepp TKA energy chain—Strain relief and C-rail with Linefix" https://www.youtube.com/watch?v=T4HqpEKbisM (Year: 2018).*
(Continued)

*Primary Examiner* — Timothy J Thompson
*Assistant Examiner* — Amol H Patel
(74) *Attorney, Agent, or Firm* — Grossman, Tucker, Perreault & Pfleger, PLLC

(57) ABSTRACT

A strain relief device for at least one supply line. The strain relief device can be or is disposed on a line-guiding apparatus for guiding the at least one supply line and has at least one main body, which comprises at least one coupling means for the fastening of the at least one supply line to said coupling means and thus to the strain relief device in such a way that strain is relieved. At least one preferably flexible coupling element is provided, which can be disposed so as to peripherally surround the coupling means and the line to be fixed on the coupling means and which surrounds the line together with the coupling means in the form of a loop. There are fastening means on the main body for fastening the main body to the strain relief device in such a way that tensile force is absorbed. A guide element having a guide region for the coupling element is provided adjacent to the at least one coupling means. The guide region is designed to guide the coupling element as the coupling element is (Continued)

transferred from a position at a distance from the coupling means to the position of the coupling element in which the coupling element fastens the supply line to the coupling means in such a way that strain is relieved.

26 Claims, 5 Drawing Sheets

(51) Int. Cl.
*H02G 11/00* (2006.01)
*H02G 15/007* (2006.01)

(56) References Cited

U.S. PATENT DOCUMENTS

| | | |
|---|---|---|
| 7,082,852 B2 | 8/2006 | Ikeda et al. |
| 11,227,707 B2 | 1/2022 | Hermey et al. |
| 2005/0097878 A1* | 5/2005 | Blase ................. F16G 13/16 59/78.1 |
| 2012/0281958 A1 | 11/2012 | Petersen et al. |
| 2013/0020290 A1* | 1/2013 | Epperlein ............ H02G 3/0475 219/121.6 |
| 2014/0198458 A1* | 7/2014 | Carlson ................ H02G 15/007 361/728 |
| 2020/0161847 A1 | 5/2020 | Hermey et al. |
| 2020/0287369 A1* | 9/2020 | Kaun ................... H02G 3/0456 |

FOREIGN PATENT DOCUMENTS

| | | |
|---|---|---|
| DE | 10348815 | 5/2004 |
| DE | 202017101483 | 5/2017 |
| DE | 202017102147 | 6/2017 |
| WO | 2010/117554 | 10/2010 |

OTHER PUBLICATIONS

International Search Report and Written Opinion from corresponding PCT Application No. PCT/EP2021/058257, dated Jun. 30, 2021. English translation attached.
English translation of International Preliminary Report on Patentability from corresponding PCT Application No. PCT/EP2021/058257, dated Oct. 25, 2022.
Igus GMBH, "Avoiding Cable Failure-Strain Relief", Youtube, Mar. 31, 2020, https://www.youtube.com/watch?v=2jbs0wbtqJE, retrieved on Jun. 22, 2021.

* cited by examiner

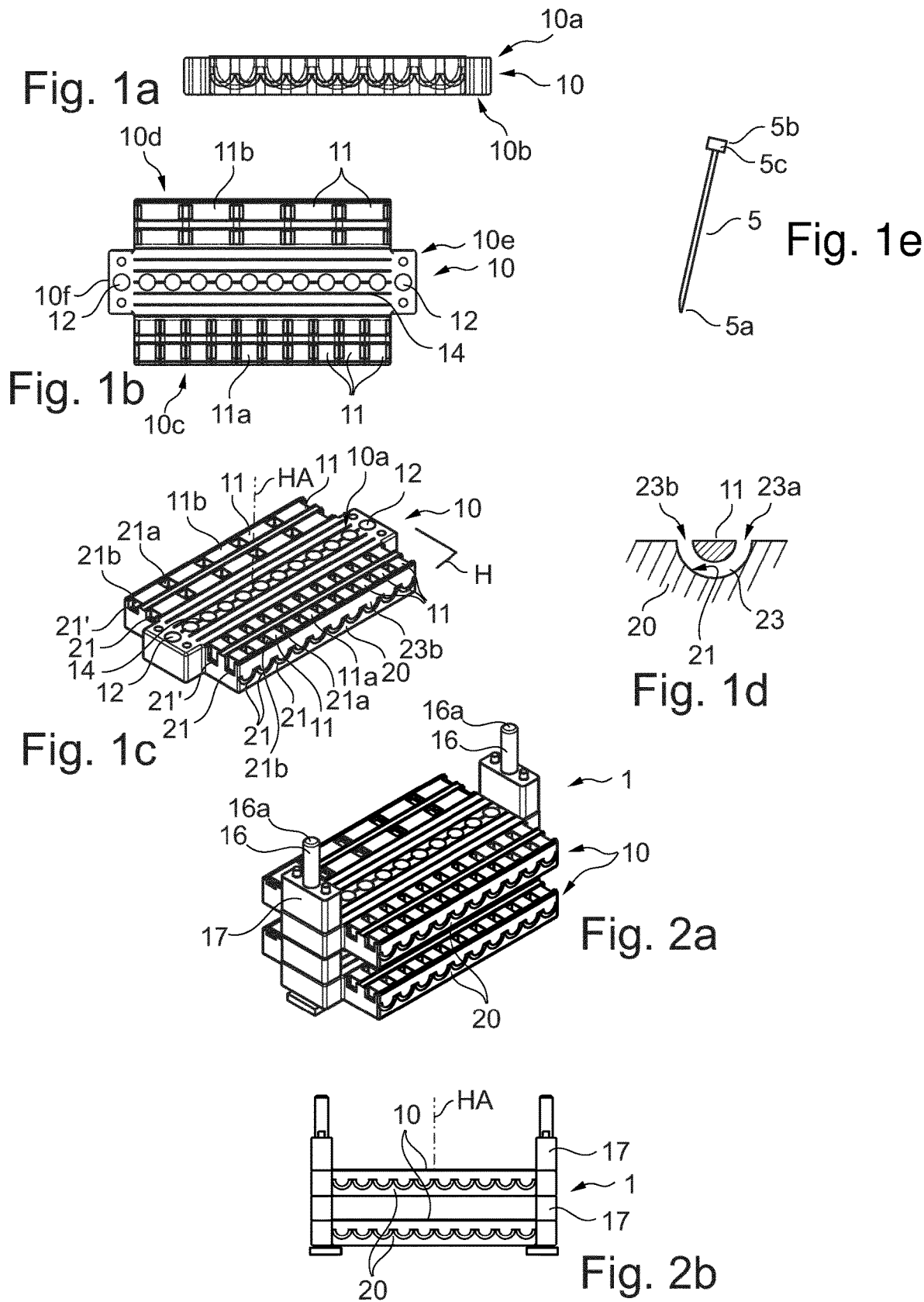

STRAIN RELIEF DEVICE

FIELD

The invention relates to a strain relief device for at least one or more supply lines such as hoses, cables or the like, wherein the strain relief device is arrangeable or arranged on a line-guiding apparatus for guiding the named at least one supply line.

BACKGROUND

In the case of line-guiding apparatuses during the movement of which different portions of the line-guiding apparatus are altered in terms of their position relative to one another, generic strain relief devices are used to bring about a strain relief for the supply line(s) arranged in the line-guiding apparatus, and thus to reduce mechanical damage thereof. The strain relief device is to guarantee a reliable strain relief of the lines over long operating periods even in the case of high mechanical loads. The strain relief device is furthermore to be easy to handle, with the result that the respective supply line is fixable to the strain relief device without great effort, in particular even if a plurality of lines are provided.

A strain relief device for fixing a plurality of lines arranged in several rows one above another is known from WO 2018/189182 A1. For the fixing, the lines are to be pre-positioned on the strain relief device, and are then simultaneously fastened to the strain relief device in a strain-relieving manner by suitable means. For one thing, a disadvantage here is that, at the time of the fixing, all lines have to maintain their desired position in the pre-positioning. Furthermore, all lines have to be released from their strain-relieving state if only one line is to be replaced. When all lines are fixed again, the desired position of each individual line then has to be checked.

Strain relief devices in which the respective supply lines are fixed in each case individually to the strain relief device by means of the flexible coupling element have therefore proved worthwhile for various applications. In the case of a plurality of lines on the strain relief device, however, these are often not only arranged in rows of several lines arranged adjacent to one another, but also arranged in several rows one above another, for example several base bodies arranged one above another and populated with lines are provided. However, this often makes the attachment of the coupling element to the strain relief device difficult in terms of handling, because the coupling means assigned to the respective line is then often accessible only with difficulty, and it is manually laborious to position the coupling element in a loop around the line and the coupling means provided for the latter, in order to fix the line thereto in a strain-relieving manner. Here, the positioning of the coupling element on the coupling means is often made more difficult by coupling means and/or lines that are adjacent and/or provided below the location of attachment of the coupling element.

SUMMARY

The object of the invention is therefore to provide a generic strain relief device by means of which the respective supply line is fixable, by means of the preferably flexible coupling element, quickly and easily to the coupling means provided for it in a strain-relieving manner, in particular if a plurality of lines are arranged on the strain relief device, in particular several lines arranged adjacent to one another on one base body or lines arranged in several layers one above another, for example on base bodies arranged one above another.

According to the invention, adjacent to the at least one coupling means for the strain-relieving coupling of the at least one supply line (generally also called: "line"), a guide element with at least one guide region for the preferably flexible coupling element, by means of which the at least one line is fastenable or fastened to the coupling means, is provided. The guide region is formed such that it guides the coupling element during a transfer of the preferably flexible coupling element from a position of the coupling element spaced apart from the coupling means (hereinafter also called: "infeed position") into its position fastening the line to the coupling means in a strain-relieving manner (hereinafter also called: "fastening position"). Here, the guiding is effected by an interaction of the coupling element with the guide region, for example in that the two come into contact with one another and, during a further advancement of the coupling element in the direction of its fastening position, the latter is guided by the guide region. The named advancement can be effected manually in each case. The coupling element is preferably an elongate, for example band-like, element, for example a conventional cable tie or the like. Here, in its fastening position, the coupling element can be arranged in a loop. "In a loop" preferably means that the group of the (one or more) coupling means and the one or more lines arranged in the loop and fixed to the (one or more) coupling means become or are surrounded completely, thus through 360°, by the loop of the assigned coupling element. The coupling element can be elastically or plastically deformable, in particular by manual manipulation thereof. Owing to this interaction or contact with the coupling element, the guide region brings about a guiding of the coupling element or of a partial portion thereof during an advancement of the coupling element in the direction of its fastening position. This is particularly preferably effected owing to the shape of the guide region, with the result that the coupling element particularly preferably experiences a forced guiding during its infeed to the coupling means in the direction of its fastening position through the guide region. In the fastening position of the coupling element, the latter is preferably arranged between the guide element and the coupling means. The guide element can generally have at least one or also several guide regions, preferably several guide regions arranged adjacently in the longitudinal direction of the guide element.

Generally within the framework of the invention, the coupling element is preferably designed as a flexible element which, owing to its flexibility, is transferrable from a rectilinear form into a looped form, preferably by manual deformation or by deformation when the coupling element is, preferably manually, inserted and advanced into the region between the guide region and the coupling element. The coupling element can be elastically or plastically deformable. In particular cases, however, the coupling element can also be formed substantially rigid, when it surrounds the coupling means and lines to be fixed thereto in a strain-relieving manner in a loop.

The at least one or more coupling means and the at least one or more lines, which are fastenable or fastened to one another in a strain-relieving manner by a looped coupling element and, for this purpose, are arranged specifically in the loop of the one coupling element, are regarded as being reciprocally "assigned" to one another. The one coupling element, the (one or more) coupling means and the at least one or more lines are thus assigned to one another. Furthermore, the guide region, which guides the one named coupling element during its strain-relieving fastening of the (one or more) coupling means and line(s) arranged in the loop thereof, is assigned to this coupling means and to the (one or more) coupling means and line(s) arranged in the loop thereof. In the fastening position of the coupling element, the latter is thus arranged between the guide element assigned to it and the (one or more) coupling means interacting with it.

Through the arrangement of the guide element with the at least one guide region, the transfer of the coupling element into its fastening position is made much easier, in particular when there are confined space conditions. This can for example be the case if, on the base body, several coupling means laterally spaced apart from one another are provided, which are spaced apart from one another for example in the longitudinal direction of the base body, and/or in the case of several coupling means arranged one above another, for example in the case of base bodies arranged one above another or stacked, thus generally in the case of the strain-relieving fastening of several lines arranged adjacent to one another and/or one above another to the strain relief device.

By "fixing" or "fastening" of a line to the respective coupling means or the strain relief device may always be meant in each case a strain-relieving fastening of the line to this/these coupling means by means of the coupling element, unless otherwise indicated specifically by the context. This also applies correspondingly to a plurality of lines. The terms "fixing" and "fastening", or "fix" and "fasten", may generally be understood in each case as synonymous. Generally within the framework of the invention, a "fixable" line also discloses a correspondingly "fixed" line.

On an end region of the preferably flexible coupling element (generally also abbreviated to: "coupling element"), a fastening means can be arranged in order, in the case of a looped arrangement of the coupling element, to fix a portion, spaced apart from said end region, of the coupling element to the named fastening means thereof in a tensile-force-absorbing manner and hereby to be able to fix the line to the coupling means in a strain-relieving manner. For this purpose, the fastening means of the coupling element can for example interact in a friction- and/or positive-locking manner with the portion spaced apart from the end region thereof.

The coupling element is generally preferably formed as an element that can be handled separately, thus it can be spaced apart from the assigned coupling means and/or its position can be altered as desired. The coupling element can optionally also be captively held on a part of the strain relief device, for example on the base body and/or the coupling means and/or the guide element. There can optionally also be a captive holding during the fastening of the line by means of the respective coupling element, for example until the strain-relieving fastening of the line to the respective coupling means is formed.

The coupling means can generally be formed for example as a rib-like or peg-like region, which is arranged on the base body, for example is connected thereto in a material-bonding manner, for example by being molded on it in one piece. The coupling means can optionally also be formed as a component, separate from the base body, which is fastened or fastenable to the base body in a tensile-force-absorbing manner by corresponding means. For the strain-relieving fastening of the supply line, the latter can then be aligned coaxially with respect to the coupling means and be fastened or have been fastened to the coupling means in this alignment. The end region of the line which is fastened to the coupling means is preferably formed rectilinear, but this is not imperative. In general, the coupling means can be a region or means which is fastened to the base body in a tensile manner and to which the coupling element is fastenable in a tensile-force-absorbing manner for the purposes of fixing the line. The (one or more) coupling means is/are generally preferably fastened to the base body in a material-bonding manner, in particular by being molded in one piece. The coupling means can for example project or extend away from the base body and thus have a free end region, or for example be laterally delimited by two gaps, which can be arranged in the base body, wherein the coupling element can pass through the gaps, preferably with portions spaced apart from one another in the longitudinal direction of the coupling element.

In general, the strain relief device is preferably formed such that at least one or more lines is/are fixable or is/are fixed to at least one coupling means in a strain-relieving manner by means of in each case at least one preferably flexible coupling element. For example, one coupling element can fasten exactly one line to exactly one coupling means.

One line or a set of several lines can also have several fastening cross sections, which are spaced apart from one another in the line longitudinal direction, wherein each of the fastening cross sections is fixable or fixed to one or more coupling means by a coupling element—a fastening cross section of a line is thus in each case the line cross section fixed in a strain-relieving manner by means of a coupling element.

The strain relief device can preferably also be formed such that a given line is fastenable or fastened to several coupling means simultaneously in a strain-relieving manner by means of one coupling element, wherein these several coupling means (here: "named coupling means" or "totality of coupling means") can be arranged adjacent to one another, for example on one base body. "Adjacent" means, in particular, spaced apart from one another laterally in relation to the line longitudinal direction. A line with a given diameter can thus, for example in its position fastened to the strain relief device, extend in terms of the line diameter over two or more coupling means arranged adjacent to one another, with the result that a coupling element arranged in a loop then comprises said line and the named two or more coupling means in its circumference and receives them in the loop of the coupling element. Here, the width of the guide region can preferably be greater than the width of one of the named coupling elements, can preferably be at least substantially equal to the width of the totality of the coupling means to which the coupling element is fixable or fixed and in the fastening state surrounds the line(s) in a loop. Here, the guide region can extend at least partially over those of the named several coupling means which have the greatest lateral spacing from one another, thus spacing transverse or perpendicular to the line(s) fastened to the named coupling means. Another line with a smaller diameter than the above-named line can be fastened, by means of a or the coupling element used above, to a sub-group of the above-named "totality of coupling means", which sub-group has a "smaller number" of coupling means than the totality. Here, this other line can extend, in terms of its diameter, over the width of only one or a smaller number of coupling means and be fastenable or fastened to only this one or to the smaller number of coupling means in a strain-relieving manner by means of the preferably flexible coupling element, precisely because the coupling element surrounds said line and the only one or the smaller number of coupling means in a loop. Here a guide region is expediently provided, which extends, in terms of its width, only over one coupling means or only at least substantially over the entire width of the smaller number of coupling means or at least partially over the coupling means of this sub-group spaced furthest apart from one another. This guide region can be interchangeable with the above-named guide region for the totality of coupling means, as a result of which there is a particular flexibility for the strain-relieving fastening of lines with different diameters.

The "width" of the coupling means or "width" of the guide region may be generally the extent thereof in the longitudinal direction of the base body and/or extent transverse or perpendicular to the at least one line fastened to the coupling means.

Several lines can optionally also be fastenable or fastened to only one coupling means by means of one coupling element, although this is less preferred. The coupling means can optionally also be arranged laterally with respect to the line/lines fastened or to be fastened thereto, with the result that line and coupling means are arranged adjacent to one another in the longitudinal direction of the base body.

The different named variants of the fastening of at least one or more lines to at least one or more coupling means can also be realizable or realized simultaneously on the strain relief device with respect to different lines.

The guide region is preferably formed, together with at least one coupling means assigned thereto, as a preassembly means for the coupling element. This means that the coupling element, in an arrangement between the guide region and the coupling means (called "preassembly position"), is held thereby or by the guide element comprising this guide region and the coupling means, without manual manipulation of the coupling element, namely in a state of the coupling element in which it does not yet surround the line to be fixed to the coupling means in a loop and/or does not yet fix it to the coupling means in a tensile-force-absorbing manner. In this preassembly position, the coupling element can already be arranged in its desired position in the fastening position, in the described state, and/or in a position upstream of the fastening position, in which the coupling element is thus still to be moved further in the direction of its fastening position. The manual handling of the coupling element during the strain-relieving fastening of the respective line is hereby made much easier.

According to a particularly preferred embodiment, the guide region is formed in order, during or in the case of an infeed of the preferably flexible coupling element laterally to and in the direction of the coupling means, by interaction of the guide region with the coupling element, to divert the latter around the coupling means onto the other side of the coupling means, with the result that the coupling element emerges from the guide region on this other side of the coupling means. Through this diversion, a region of the loop of the coupling element is preferably formed, which surrounds the at least one coupling element and the at least one line fastened thereto by means of the coupling element. The infeed of the coupling element is thus effected for example from the top side of the base body, on which the coupling means is arranged. Said top side faces away from the underlying surface to which the strain relief device is fastened, wherein the underlying surface can also be a region of the line-guiding apparatus. By the infeed "laterally to" the coupling means is meant that the coupling element is led past a first side of the coupling means, wherein the longitudinal extent of this side runs at least substantially parallel to the longitudinal direction of the coupling means and/or the at least one line fixed or to be fixed thereto, thus for example is led past the coupling means laterally thereto touching it or at a certain preferably small spacing therefrom. The coupling element can be fed in for example in a straightened, in particular rectilinear, form onto the guide region, in particular the gap between guide region and coupling means, wherein the infeed direction is parallel or coaxial with respect to the longitudinal direction of the element, or in another way with a corresponding effect. On the side of the coupling means facing away from the infeed direction, the coupling element is diverted around the coupling means by means of the guide region preferably by interaction therewith, wherein the diverted portion is transferred to the other side of the coupling means, which lies opposite the first infeed side. In the case of this diversion, a fed-in rectilinear coupling element preferably experiences a curvature, preferably an arc-shaped curvature, in the portion by which it interacts or comes into contact with the guide region, owing to its flexibility, wherein the coupling element is preferably deformed, for example is reversibly and/or elastically deformed. With an advance of the coupling element on the guide region in the direction of its fastening position, the curvature can travel through the coupling element in its longitudinal extent. The transfer of the coupling element into its fastening position is hereby made much easier, because through the diversion of the coupling element by the guide region it experiences a forced guiding and the free end of the coupling element, when it emerges from the guide region in the case of further advancement, can thereby be easily manually gripped in order to perform the fastening of the at least one line.

The guide region can generally have an entrance, in order to insert the free end of the coupling element into the guide region, and an exit, which is spaced apart from the entrance. Here, the entrance of the guide region can be arranged such that the coupling element can be fed into the guide region perpendicularly or obliquely with respect to the main plane or top side of the base body in order to be able to be inserted into the entrance of the guide region. The entrance of the guide region is preferably formed in the form of a gap between guide region and coupling means, which can receive the cross section of the coupling element. The coupling element inserted into the gap can thus be advanced through it by interaction with the guide region in the direction of the exit of the guide region. The exit is then preferably the opposite end of the gap between guide region and coupling means. The infeed direction of the coupling element to the entrance of the guide region can be effected at an angle of ≤60° or ≤45°, preferably ≤30°, with respect to the perpendicular of the surface or the main plane of the base body, or at least substantially perpendicular to the main plane of the base body.

Alternatively or in addition, the guide region can be formed so as to guide the coupling element during an infeed of the preferably flexible coupling element in the direction axially onto the coupling means. Here, the coupling element can be fed in along the axial extent of the coupling means onto the coupling means and transferred into the fastening position of the coupling element. For this purpose, the coupling element can for example be guided with an arc-sharped portion thereof axially in the direction of the coupling element and then pushed further into the fastening position of the coupling element. The formation of the arc portion can be effected for example owing to the flexible formation of the coupling element, for example by manual bending or other deformation, or this arc-shaped portion can already be formed on the coupling element. For this purpose, the guide region of the guide element can for example be formed open on the front end or the free end of the coupling means, for example in the form of a gap, open on the front end, between guide region and coupling means, wherein the arc-shaped portion of the coupling element, preferably in congruent alignment of this portion with the contour of the gap, is introduced into the latter. The gap can be formed arc-shaped with an arc-shaped extent about the longitudinal axis of the coupling element.

The guide region generally preferably surrounds the coupling means by an angular extent of ≥30° or ≥60°, preferably ≥90° or ≥120°, particularly preferably approximately 180°, about the longitudinal axis and/or the cross section of the coupling means. The guide region preferably surrounds the coupling means by ≤270° or ≤230° or preferably ≤210°, optionally ≤180°, with respect to the longitudinal axis and/or cross section thereof. The named angle can also represent the circumferential extent of the named gap between guide region and coupling means. What was stated above can apply correspondingly if the one coupling means fixes at least one or several lines to several coupling elements, wherein the coupling element is then diverted around several coupling means. The entrance of the named gap can then be effected on a first coupling means and the exit of the gap can be effected on another coupling means, preferably on a side thereof facing away from the first coupling means.

The respective coupling means and the guide element with the guide region preferably extend away from the central region of the base body, thus preferably have a free end facing away from the base body. Here, the central region of the base body is the middle region. Here, the base body preferably extends at least substantially perpendicular to the longitudinal direction of the line(s) fastened thereto. Fastening means for the tensile-force-absorbing fixing of the base body to the strain relief device are preferably arranged on the central region of the base body. The fastening means of the base body can for example be formed as a through hole in the base body, which passes vertically through the base body, thus between the top side and the bottom side thereof, with the result that an elongate holding means of the strain relief device can pass through the through hole. Alternatively, the fastening means of the base body can for example also be formed as fastening projections protruding away from the top or bottom side thereof or in another suitable way. Here, the line is in each case preferably fixed to the top side of the base body. The base body is preferably formed as a substantially plate-like body, to which preferably several lines are fastenable or fastened adjacent to one another. The longitudinal axis of the base body preferably extends transverse or perpendicular to the longitudinal extent of the line(s) fastened or fastenable thereto. The coupling means can generally be formed for example in the form of a rib or peg. Because the respective coupling means and the guide element extend away from the central region of the base body, the coupling element is particularly easily manually fixable to the coupling means, in particular even if several coupling means are provided adjacent to one another, for example in a comb-like manner, on the base body. Here, the coupling means can be arranged on one or both side surfaces of the base body, wherein these side surfaces connect the top and bottom side of the base body and, in relation to the orientation of the base body on the strain relief device, can represent the front and/or rear side of the base body. Here, the front side of the base body is arranged facing the free end of the line(s) fixed to the base body or the coupling means thereof and the rear side of the base body is arranged facing away from the free line end(s).

The guide region of the guide element is preferably arc-shaped, particularly preferably circular-arc-shaped, with an arc inside curvature facing the assigned coupling means. This prefigures a looped spatial arrangement of the coupling element in its fastening position in which the coupling element fixes the line to the strain relief device in a strain-relieving manner, with the result that the handling of the coupling element for the fastening of the line is particularly easily possible.

According to a particularly preferred embodiment, the guide element having at least one guide region and the at least one or more coupling means, which fix at least one or exactly one or more lines with an assigned coupling element, are fastened to the same base body in a tensile-force-absorbing manner, preferably fastened thereto in a material-bonding manner. Here, the guide element can have several guide regions and the base body can have several coupling means, with the result that, on each guide region, at least one line or optionally a group of lines is fixable to at least one or more coupling means by means of at least one coupling element. Particularly preferably, several coupling means and the guide element(s) assigned thereto are fastened to the base body in a tensile-force-absorbing manner, preferably in a material-bonding manner. Preferably for easy handling and for absorbing large tensile forces, the guide element and/or the at least one or more coupling means are fastened to the base body in a material-bonding manner, for example through the provision of a one-piece injection-molded component. The material-bonding fastening can be effected in each case in particular in the form of a one-piece molding. A strain relief device for a plurality of lines, which has several base bodies arranged for example in a stacked manner, can hereby be quickly manually constructed. Furthermore, the guide region and the (one or more) coupling means assigned thereto have a predefined spatial assignment, with the result that there is thus also an exact guiding of the coupling element between the guide region and the assigned coupling element(s). The strain relief device is particularly easy to handle for the fixing of the at least one or in particular several lines, preferably to a base body.

According to an alternative embodiment, the guide element is formed as a separate component in relation to the base body equipped with the at least one or more coupling means, wherein the guide element has the guide region(s) assigned to the (one or more) coupling means. On the one hand, the guide element is hereby easily replaceable, for example in order, by replacement with another guide element which has guide regions formed differently from the first-named guide element, to be adapted to other lines with other diameters for the fixing to the (one or more) coupling means of the base body. Alternatively or in addition, with regard to a given guide element, the base body can of course be replaced with another base body which has for example differently formed coupling elements or a different width, in order to be adapted to the respective lines to be fixed. Furthermore, in a preferred design, through the separate formation of the guide element, the latter can be arranged in different spatial arrangements relative to a predetermined base body and can be fastenable to the strain relief device, for example to the given base body. In the respective different spatial arrangements, in each case differently formed guide regions of the given guide element can face the respective base body and thereby be assigned to the (one or more) coupling means of the base body for the interaction with a coupling element. The strain relief device is hereby particularly flexibly adapted for the fixing of different lines, for example with different diameter.

It is understood that the two above-named designs with regard to a material-bonding attachment of the guide element to the base body or design of the guide element as a separate component in relation to different guide elements can be provided on one and the same strain relief device.

According to a preferred embodiment, on the two large surfaces of the base body, coupling means are arranged which, on the two lateral large surfaces, preferably have a different pitch or are generally formed differently, for example have a different width, length, surface contour, hardness or the like. Here, the "large surfaces" are to be understood as side surfaces of the base body which, in an arrangement of the base body on the strain relief device, represent the front and rear side of the base body, wherein the front side faces the free line end of the at least one line that is fixed/to be fixed. In the case of (a) line(s) fixed to the strain relief device, the large surfaces run transverse or at least substantially perpendicular to the line longitudinal direction. The two large surfaces connect the top and bottom side of the base body to one another, wherein the at least one line is fastenable or fastened to the top side, optionally also to the bottom side, of the base body. The top side of the base body faces away from the underlying surface to which the strain relief device and/or the line-guiding apparatus with the at least one line that is to be fastened or is fastened to the strain relief device leads. The (one or more) coupling means of the base body preferably protrude away from the respective large surface, thus project from the base body. The (one or more) coupling means of the base body are preferably arranged on the at least one or on both large surface(s) thereof, preferably molded thereon. Generally within the framework of the invention, however, the (one or more) coupling means can optionally also be arranged on the top and/or bottom side of the base body, wherein they preferably protrude from the large surfaces and, in the process, extend in the line longitudinal direction away from the central region of the base body. The strain relief device is hereby formed particularly flexible in order to be able to fasten different lines, for example with respectively different diameter or different properties, such as for example material properties of the line sheath to which the surface contour or hardness of the coupling means is adapted, to it, for example because the respective line is/has been fixed to the (one or more) coupling means of one or the other large surface. Here, the base body is preferably arrangeable or arranged on the strain relief device selectively with one or the other large surface thereof facing the free line end of the at least one line fastened thereto. The strain relief device is hereby particularly suitable particularly flexibly for the fixing of lines of different cross section or diameter.

Here, by "pitch" of the coupling means on the base body, and correspondingly also by pitch of the guide regions on the guide element (see below), is meant that a particular number of coupling means or guide regions is provided in the case of a predetermined length segment of the respective base body or of the guide element which extends transverse or at least substantially perpendicular to the respectively arranged line. Thus, in the case of a smaller pitch a larger number of coupling means is provided on the given length segment of the base body, correspondingly in the case of a smaller pitch a larger number of guide regions is provided on the given length segment of the guide element, and vice versa in each case. Thus, in the case of a smaller pitch a larger number of lines is fixable on the given length segment of the base body or guide element. The strain relief device is hereby particularly adapted for the fixing of lines of different diameter or cross section, in particular in the case of an arrangement of a greatest possible number of lines in each predetermined length segment of base body or guide element.

The base body is preferably formed such that it is fastenable or fastened to the strain relief device selectively with one of its two side surfaces (also called "large surfaces" or "lateral large surfaces") arranged facing the free end of the line fastened to the strain relief device. Alternatively, the line can also be selectively fastened to the respective coupling means which, in the case of the given arrangement of the base body on the strain relief device, is arranged on the front or the rear side of the base body.

Particularly preferably, according to a variant, guide regions are arranged on the two large surfaces of the base body, wherein the guide regions arranged on the two large surfaces have a different pitch or a different lateral spacing from one another and/or which are formed differently, for example have a different width and/or breadth and/or different curvature of an arc-shaped guide region. Generally within the framework of the invention, by "breadth" of the guide region is meant its extent in the longitudinal direction of the assigned coupling means or of the assigned line. Guide regions of different breadth can thus receive or guide coupling elements of different width. By "width" of the guide region is meant its extent in the longitudinal direction of the base body or transverse or at least substantially perpendicular to the line arranged thereon. The guide regions are hereby likewise particularly adapted to be able to fasten for example lines of larger or smaller cross section or diameter to the respective coupling means, preferably in the case of the greatest possible population with lines. This is particularly advantageous in combination with the above-described selective arrangement of the base body with regard to its large surfaces.

According to a variant, the guide element is preferably formed as a separate component in relation to the base body, and can preferably be formed as a plate-like component. The guide element can generally have a top side and an opposite bottom side, which run at least substantially parallel to the main plane of the guide element. Here, the main plane is the cross-sectional plane of the guide element with the largest area. Furthermore, the guide element can have large-area side surfaces (also called "large surfaces" or "lateral large surfaces") which connect the top and bottom side thereof and, in the case of lines fixed to the strain relief device, run transverse or perpendicular to the at least one or the lines.

The guide element, as a separate component, can be fastenable or fastened to the strain relief device selectively with one of its two large surfaces facing the free end of the at least one line. For this purpose, the guide element can selectively be rotated through 180° about the perpendicular of its top side. Alternatively or in addition, the guide element can be arrangeable or arranged selectively with its top or bottom side facing the assigned base body. The strain relief device is hereby formed in a particular way in order to be able to fasten different lines, for example with different cross section or diameter, to the strain relief device easily by means of the coupling element, depending on the orientation of the guide element relative to the base body, and wherein, at the same time, only a small number of different guide elements is to be provided for the fastening of a large number of different lines.

On its top side and on its bottom side, the guide element particularly preferably has guide regions, which on the top and bottom side preferably have a different pitch and/or are formed differently, thus for example have a different width and/or breadth and/or curvature—as described correspondingly with regard to the guide regions arranged on the base body. Here, the guide element is preferably formed such that it is fastenable or fastened to the strain relief device selectively with its top side or with its bottom side facing the given assigned base body. Through the selective arrangement of the guide element, the coupling means of the base body can thus be assigned guide regions which are arranged differently—corresponding to the pitch—or formed differently, in order to be able to fix differently formed lines, which have for example different diameters, by means of the interacting coupling element. The respective guide regions facing the base body—which are different depending on the selective orientation of the guide element—can, with the (one or more) assigned coupling means of the base body, form a gap or guide channel for receiving the coupling element. This design of the guide element is particularly preferably provided in combination with the above-named design of the guide element, which is fastenable or fastened to the strain relief device selectively with one of its two large surfaces facing the free end of the at least one line, thus is arrangeable in two positions twisted by 180° about its main axis relative to the respective base body of a given orientation. These designs are particularly preferably also provided in combination with a base body on the large surfaces of which coupling means of different pitch and/or design are provided, with the result that here too the base body can be arranged selectively with one of the two large surfaces facing toward the free line end. Here, the base body and the guide element are in each case formed in order to be able to be fixed or have been fixed to the strain relief device in a tensile manner in one of the desired arrangements. Through the described design of base body and guide element, a plurality of different arrangements of the two named components relative to one another are hereby possible, in order to be able to fasten different lines, for example with different diameter or cross section, to the strain relief device as required. In general, it can also be expedient to fix lines with different material properties of the line sheath, which can have greater or lesser mechanical sensitivity, different flexural rigidity etc., to different coupling means particularly adapted to these, with the result that, through corresponding selective orientation of the guide element, the latter and the assigned coupling element can then also be provided particularly suitably for fixing the respective line.

The pitch of the guide regions on the top side and on the bottom side of the guide element and/or the pitch of the guide regions on one or on both large surfaces of the guide element is preferably an integer multiple of the pitch of the coupling elements of the base body, if the respective guide regions and coupling means are assigned to one another, thus preferably forming a guide gap for a coupling element between them. A line of smaller cross section or diameter for example can hereby be fastened to only one coupling means, wherein the assigned guide region also extends only over the width of this coupling means. On the other hand, in the case of a correspondingly different arrangement of guide element and base body with respect to one another, the width of another guide region can extend over the width of two or more assigned coupling means, for fixing one or more lines to the several coupling means by means of one coupling element. There is hereby a great flexibility of the strain relief device for the fastening of lines of different cross section or diameter.

The strain relief device is particularly preferably constructed modularly, with several base bodies stacked one above another which are already equipped with guide elements or which are in each case assigned a separate guide element. The base bodies are preferably spaced apart from one another in the stacking direction by means of spacers, wherein a receiving region for the lines is formed by the spacing. The spacers can be formed as separate components or molded in a material-bonding manner, for example in one piece, on the guide elements and/or the base bodies. The base body and/or the guide element can be formed able to be cut to length as desired or in portions, in order to be able to adapt them to strain relief devices of different width.

Here, the base body and/or the guide element can be equipped with several fastening elements distributed over their length, in order to be able also to fasten the named components to the strain relief device in the cut-to-length state, for example by interaction with further fastening elements of the strain relief device.

The invention furthermore comprises a line-guiding apparatus with a strain relief device according to the invention, optionally with at least one or more lines which is/are fixed to the strain relief device in a strain-relieving manner and which is/are guided by the line-guiding apparatus. The strain relief device can be arranged on at least one end region (end portion), for example an end fastening part, of the line-guiding apparatus, or else outside the line-guiding apparatus. The line-guiding apparatus generally has two end regions, which are alterable in terms of their position relative to one another, and preferably several or a plurality of portions, which are alterable in terms of position relative to one another, between the two named end regions thereof. The end regions of the line-guiding apparatus can be connected to a stationary connection point and a movable connection point for the lines. The line-guiding apparatus can for example be arrangeable or arranged so as to form a lower strand, an upper strand and a diverting region arranged in between. The line-guiding apparatus can also be configured for other traversing movements, for example in the form of a circular movement, spiral movement or also a complex, multi-axial three-dimensional movement.

BRIEF DESCRIPTION OF THE DRAWINGS

The invention will be described below with reference to various embodiment examples. All of the features of the individual embodiment examples are disclosed independently of one another generally within the framework of the invention. Furthermore, all of the features of the respective embodiment example can also be implemented in all of the other embodiment examples, unless this specifically contradicts the individual embodiment examples. In the figures, identical features are provided with identical reference numbers or with reference numbers increased in steps of 100. There are shown in:

FIGS. 1a-1e: a first embodiment of a base body with coupling means and guide elements of a strain relief device according to the invention in a side view (FIG. 1A), in a plan view (FIG. 1B), in a perspective view (FIG. 1C), in a detail view (FIG. 1D), and with a coupling element (FIG. 1E);

FIGS. 2a-b: a strain relief device according to the invention with base bodies in a perspective view (FIG. 2A) and in a front view (FIG. 2B);

DETAILED DESCRIPTION

Figure 3A:
FIGS. 3a-3c: a second embodiment of a base body with coupling means and guide elements of a strain relief device according to the invention in a side view (FIG. 3A), in a plan view (FIG. 3B) and in a perspective view (FIG. 3C)

FIG. 1 shows a base body 10 of a strain relief device 1 according to the invention, as is represented by way of example in FIG. 2. The strain relief device 1 is formed for the strain-relieving fixing of at least one or more supply lines 50 thereto (see FIG. 7 correspondingly), wherein the at least one or more lines are guided by the line-guiding apparatus 100 (see FIG. 8). The base body 10 according to FIG. 1 of the strain relief device 1 has at least one coupling means 11 for the strain-relieving fastening of the at least one line 50 to the strain relief device 1, here several coupling elements arranged in a comb-like manner on the base body 10, which are arranged in a row and are laterally spaced apart from one another. The coupling means 11 is here formed as a peg-like or rib-like portion of the base body 10. The coupling means 11 is fastened to the base body 10 in a tensile-force-absorbing manner, here fastened thereto in a material-bonding manner, more specifically molded thereon in one piece, but can also be formed as a separate component. The line 50 is fixable or fixed to the respective coupling means 11 by means of a preferably flexible coupling element 5. For example, one line is fixable or fixed to each of the coupling means 11. The respective coupling element 5 surrounds the line 50, if the latter is fixed to the one or optionally several coupling means 11 in a strain-relieving manner, together with the one or more coupling means 11 fixing the line, in a loop, with the result that the line and the (one or more) coupling means are arranged in the loop of the coupling element 5 and fixed to one another (see FIG. 7). Here, the coupling element is preferably affixed, thus connected in a tensile-force-absorbing manner, to itself in order to close the loop, as represented correspondingly in FIG. 7 in the case of another design of the base body. Here, the coupling element is formed as a flexible coupling element which is manually deformable, for example plastically, preferably elastically, deformable. Here, the coupling element is formed in a band-like manner, wherein a first end portion 5a of the coupling means is connected to a second end portion 5b in a tensile-force-absorbing manner by means of the fastening means 5c.

Figure 7A:
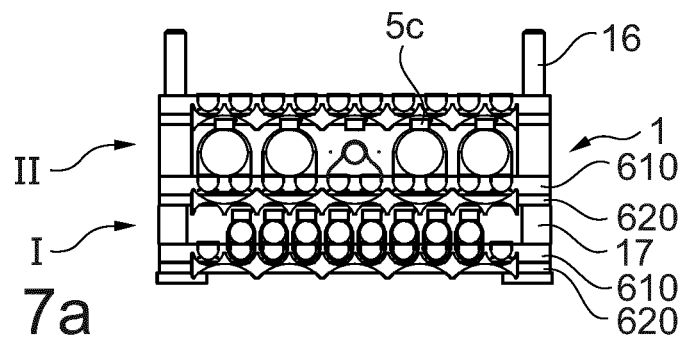
FIGS. 7a-7c: a strain relief device according to the invention with base bodies according to FIGS. 6A, B and with guide elements according to FIGS. 6C, D, and with supply lines fixed in a strain-relieving manner, in a side view (FIG. 7A), in a front view (FIG. 7B) and in a perspective view (FIG. 7C)

According to the invention, adjacent to the at least one coupling means 11 of the base body 10, a guide element 20 is provided, which has at least one guide region 21 for the coupling element 5, in order to guide the latter during the fixing of the respective line to the coupling means assigned to the guide region 21. According to the embodiment example, each guide region 21 is assigned exactly one coupling means 11, in order to fix a line thereto, optionally a guide region 21 can also be assigned several coupling means, in order to fix at least one, preferably exactly one, line thereto by means of the coupling element 5, as represented in FIG. 7A. The base body 10 has a plurality of guide regions 21, which are arranged in a comb-like manner or adjacent to one another, preferably corresponding to the comb-like arrangement of the coupling means. The coupling means 11 and the guide region 21 extend coaxially with respect to the fixed line. In the case of a transfer of the coupling element 5 from a position spaced apart from the coupling means 11 into its position fastening the supply line 50 to the coupling means 11 in a strain-relieving manner (fastening position), the coupling element 5 is guided by the guide region 21 of the guide element 20, which makes the fastening easier. According to this embodiment example, the guide element 20 is connected to the base body 10 in a material-bonding manner. The base body 10 with the, here several, coupling means 11 as well as several guide elements 20 is formed in one piece, for example as an injection-molded part, in particular a plastic injection-molded part.

The guide region 21 of the guide element 20 is formed such that, when the preferably flexible coupling element 5 is fed laterally (arrow) towards the coupling means 11 and in the direction to the coupling means, it diverts the coupling element on the side of the coupling element 5 facing away from the infeed direction around the coupling means 11 onto the other side of the coupling means, with the result that the coupling element emerges from the guide region 21 on this other side of the coupling means. The lateral infeed of the coupling element can be effected touching or at a small lateral spacing from the coupling means. During this guiding and diversion, the coupling element, more specifically the fed-in end portion 5A thereof, and the guide region come into contact with one another. For this purpose, the guide region has an entrance 21A, into or in which the free end 5a of the coupling element 5 is inserted or makes contact with the guide region for the first time, as well as an exit 21B, from which said free end 5a of the coupling element, if it has been pushed far enough into the guide region, emerges or decouples from the guide region. During the described lateral infeed to the guide region 21, the coupling element 5 can be arranged straightened and, during further manual advancement and guiding by means of the guide region 21, is deformed in an arc-shaped manner, with the result that it extends around a peripheral portion of the coupling element. The coupling means 5, before its interaction with the guide region 21, can optionally also have another shape, for example can have an arc-shaped end portion at the free end 5a, as long as the free end 5A of the element 5 can enter the entrance 21A of the guide region 21 and, in the case of further advancement, can emerge at the exit 21b, wherein the infeed movement can be correspondingly adapted to the shape of the coupling element, with the result that a deformation of the end region of the element 5 during its advancement through the gap is not strictly necessary. The guide region 21 and the coupling means 11 between them form a gap 23, into which the free end 5A of the coupling element 5 is inserted, and guided through it up to the exit 21B. The gap 23 thus represents a guide channel for the element 5 during its advancement. Here, the entrance 21A and the exit 21B of the guide region 21 or of the named guide channel are arranged on the same side, here the top side 10A, of the base body 10, with the result that the coupling element 5 or its end region is diverted through 180° about the coupling means 11 during the advancement of the element 5 on the guide region 21 or through the gap. The guide region thus surrounds the coupling means by an angular extent of approximately 180° about its longitudinal axis and/or its cross section. The entrance 21A is arranged on a first side of the coupling means, the exit 21B is arranged on the opposite, "other" side of the coupling means 11. The infeed direction of the end 5a to the guide region and the emerging direction of the end 5a from the gap are thus at least substantially mutually opposed. Here, the guide region 21 of the guide element 20 is arc-shaped, in particular circular-arc-shaped, with an arc inside curvature facing the assigned coupling means 11. The side of the coupling element facing the guide region 21 can be formed arc-shaped, with a convexity toward the guide region 21.

The coupling element 5 has a fastening means 5C on the end or end region opposite the free end 5A (insertion end). The end region 5A or a portion of the coupling element arranged between the ends 5A, 5B can, in the case of a looped arrangement of the coupling element, be fixed to the fastening means 5C, thus the element 5 can hereby be affixed to itself, in order to fix the corresponding line 50 to the coupling means 11 in a tensile-force-absorbing manner, as represented for example in FIG. 7. Here, the loop of the element 5 comprises the line 50 and the at least one or more coupling means to which the line is fixed.

The base body 10 has a top side 10A and a bottom side 10B opposite it, as well as two large surfaces 10C, 10D connecting them, which form side surfaces of the base body, and extend transverse or perpendicular to the line 50 that is to be fastened/is fastened. Here, the base body 10 is formed in a plate-like manner, but it can optionally also have another shape. Furthermore, the base body 10 here is delimited by narrow sides 10E, 10F.

Here, the gap or guide channel 23 formed by the guide region 21 and the coupling means 11 (FIG. 1*d*) is formed at least partially closed in relation to the side surfaces 10C, 10D, here by the molding regions 23B. In the case of insertion of the end 5a of the coupling element into the gap or guide channel 23, the molding region 23B can provide an additional, lateral, guide for the element 5. However, the gap 23 can also be formed open to the large surfaces 10C, 10D or to the ends of the coupling means 11 facing away from the base body 10.

The base body 10 has a central region 14, from which the at least one, here the plurality of, guide region(s) 21 of the guide element(s) 20 and the coupling means 11 assigned to the respective guide region extend away, with the result that these are particularly easily accessible and the line is particularly easily fastenable to the strain relief device.

Coupling means 11 with guide regions 21, assigned thereto, of the guide elements 20 are provided on the two large surfaces 10C, 10D of the base body. Here, the respective line 50 can be fastened selectively to the coupling means 11A of the side surface 10C or to the coupling means 11B of the side surface 10D in a strain-relieving manner. The fixing of the respective line 50 is hereby made easier, if a plurality of lines are fastened to the strain relief device. The coupling means 11A, 11B arranged on the two large surfaces or side surfaces 10C, 10D have a different pitch and/or a different formation, such as for example diameter. In the case of a different pitch, in each predetermined length unit of the base body, the coupling means 11A or 11B are arranged on the base body in a different number, this applies correspondingly to the guide regions 21 assigned to these arranged on the two large surfaces 10C, 10D, which are assigned in each case to the coupling means of the respective large surface. Here, said length unit of the base body runs transverse or perpendicular to the line(s) 50 fastened thereto or to the longitudinal direction of the coupling means 11A, 11B. Here, the coupling means 11*a* have a smaller pitch than the coupling means 11*b*, which correspondingly also applies to the guide regions 21, assigned to the respective coupling means 11*a*, 11*b*, on the two large surfaces 10*c*, 10*d*. Here, the coupling means 11B have a greater width than the coupling means 11A and the guide regions 21A on the side surface 10C have a greater width than the guide regions 21B on the side surface 10D, which are assigned to the coupling means 11B. The base body is hereby particularly adapted in order to fix lines of different cross section or diameter to the respective coupling means, for example lines 50 of larger diameter to the wider coupling means 11B, in the case of a greatest possible number of lines on the base body.

The base body 10 is formed so that it is fastenable to the strain relief device in two positions, which are arranged twisted to each other through 180° about the base body main axis HA, wherein the base body main axis is arranged perpendicular to the base body main plane H. Here, the base body main plane HA extends parallel to the top and bottom side 10A, B of the base body 10. The base body 10 is hereby formed in order to be able to be fastened to the strain relief device selectively with one of the two lateral large surfaces 10A, 10B facing the free end of the line 50 fastened to the base body, wherein the free line ends can have connection means 50*a* (FIG. 8). The fixing of the lines to the coupling means 11*a*, 11*b* that are particularly suitable for this is hereby made much easier and the respective coupling means are easily accessible. However, the respective line can optionally also be selectively fastened to the (one or more) coupling means which is/are arranged on the side surface 10C, 10D facing away from the respective free line end.

On a coupling means 11, a first guide region 21 and at least one second guide region 21' are arranged one behind the other in the longitudinal direction of the respective coupling element 11. The statements relating to the guide region 21 also apply correspondingly to the further guide region(s) 21', in each case the two or more guide regions can be formed structurally identical. Each of the guide regions 21, 21' is assigned a region of the respective coupling means 11, to which a coupling element 5 is fastenable in each case for the fixing of a line, with the result that two or optionally more coupling elements following one another in the longitudinal direction of a coupling means 11 are thus fastenable thereto. The respective line 50 can hereby be fixed selectively to one of the two coupling regions of the respective coupling means 11 with a coupling means 5, which makes the handling easier in the case of closely adjacent coupling means, or the respective line can be fixed to both coupling regions 11, 11' of the respective coupling means 11 with in each case one coupling means 5, in order to be able to absorb larger tensile forces. Between the coupling regions, arranged one behind another, of a coupling means 11 and/or between the guide regions assigned thereto in each case, arranged one behind another, in each case a projection is provided, which is here formed in a rib-like manner, and acts as a means for securing against displacement of the coupling element in the longitudinal direction of the coupling means.

All statements in the embodiment example with regard to "a coupling means" and/or "a guide region" and/or with regard to the fastening of "a line" can apply in each case to several or all of the coupling means, guide regions and/or lines arranged collectively on a large surface or the base body. The respective coupling means and/or guide regions on a large surface or side surface of the base body can be formed structurally identical or different in each case.

The base body 10 has fastening means 12 for the tensile-force-absorbing fastening thereof to the strain relief device 1, optionally the base body 10 can also be directly fastenable or fastened to an underlying surface 101 (see FIG. 8) and/or to another apparatus, such as for example the line-guiding apparatus 100, in a tensile-force-absorbing manner. Here, the fastening means 12 of the base body 10 are arranged on the central region 14 thereof, more specifically in the region of the narrow sides 10e, 10f thereof, or in another suitable location. The (one or more) fastening means 12, here formed by way of example as a through hole, can couple to another fastening means 16 of the strain relief device which fixes several base bodies arranged stacked one above another, for example to the underlying surface 101 and/or to the line-guiding apparatus 101, in order thus to fix a plurality of lines 50 and the strain relief device (see FIGS. 2, 7). Here, the fastening means 16 is formed by way of example as a rod or bolt and passes through the through hole 12 of the respective base body 10. The base bodies can optionally also be fixed directly to one another. On the end regions 16a of the fastening means 16, corresponding fastening elements (not represented) can be provided for the fixing of the base bodies or of the base body stack. As represented in FIG. 1, the base body 10, here specifically the central region thereof, can have a plurality of fastening means 12, in order to interact with several fastening means 16, in order to be able to absorb larger forces, or in order also to be able to fix a base body that has been cut to length to the fastening means 16. According to FIG. 2, the base bodies 10 can be spaced apart from one another by spacers 17, in order to be able to arrange the lines 50 in this spacing. The spacers 17 interact with corresponding means 24, 524 of the base body, in order to fix them to the base bodies 10 in a manner secured against displacement and/or twisting, for which purpose here for example pegs of the spacers engage in depressions 24, 524 of the base body 10. The spacers 17 can for example also be molded on the base body 10. Here, the strain relief device 1 has several base bodies 10 arranged one above another, which are selectively arrangeable in different numbers thereon, optionally also selectively cut to length. There is here a particularly favorable modular design of the strain relief device, which is simply constructed and variably usable as well as particularly adapted to the handling of the base body with the coupling means and guide regions.

Figure 3B:
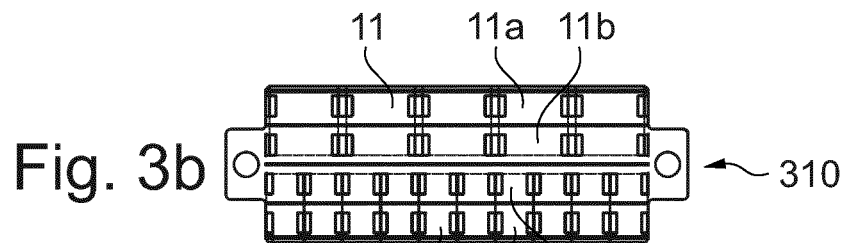
Figure 3C:
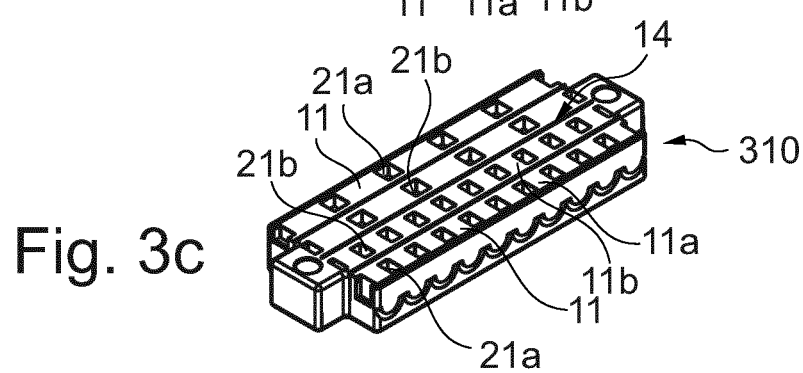

FIG. 3 shows a modification of the base body 310 compared with the base body 10 according to FIG. 1 with the following differences, for the rest reference may be made to the statements relating to FIGS. 1 and 2. The coupling means 11 partially protrude, with the portions 11A, from the base body 310 and are partially, here with the portions 11B, integrated in the base body 310 or its central region 14, which saves on installation space. Here, the guide regions 21 are also arranged partially, with the portions 21A, extending away from the base body, partially, with the portions 21B, integrated in the base body.

Figure 4A:
FIGS. 4a-4c: a further embodiment of a base body with coupling means and guide elements of a strain relief device according to the invention in a side view (FIG. 4A), in a plan view (FIG. 4B) and in a perspective view (FIG. 4C)
Figure 4B:
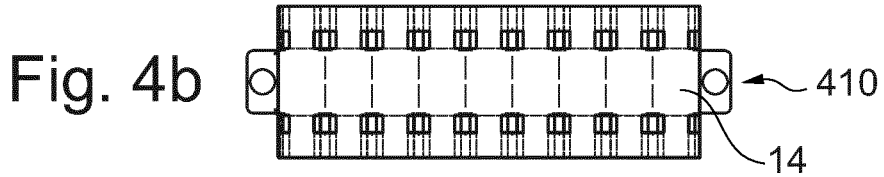
Figure 4C:
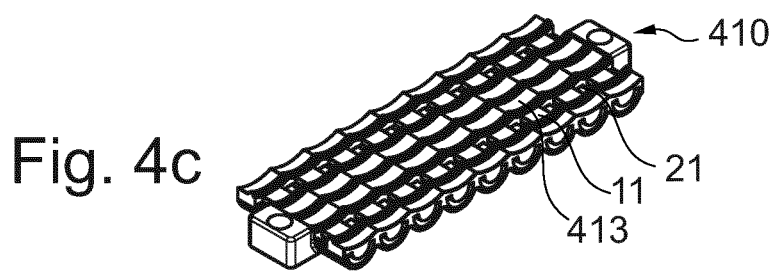

FIG. 4 shows a further embodiment example of a base body 410 in a modification of a base body 10 according to FIG. 1 with the following differences, for the rest reference may be made to the statements relating to FIGS. 1 and 2. Here too, the coupling means 11 and guide regions 20 protrude from the base body, but they can also, as in the example according to FIG. 3, be at least partially integrated in the base body. Here, the coupling means 11 and guide regions 21 have the same, but optionally also a different, pitch on the two opposite lateral large surfaces 20A, 20B. The coupling means 11 are arranged on the two large surfaces 410A, 410B, but optionally also only on one of them. The coupling means 11 and the regions 413 which are arranged in an axial elongation of the coupling means 11 on the central region 14 of the base body in each case have an indentation, which together extend over the entire width of the base body. Here, the line 50 that is to be fastened or is fastened can be placed into the indentation or in its fixed state has been placed therein. The indentation can be designed arc-shaped, in particular circular-arc-shaped, and can generally be adapted to the line cross section. There is hereby a more secure hold of the line on the base body 410 in the state fastened in a strain-relieving manner or also on the base body in its preassembly arrangement. In addition, lines 50 are hereby fixable to the base body 410 for example with a mechanically sensitive exterior region or line sheath with low mechanical load or contact pressure.

The respective guide region can have a continuous guide surface in relation to the advancing direction of the coupling element from the entrance on the guide region or guide channel to the exit for the coupling element from or out of it. This can relate in each case to the infeeds of the coupling element laterally to the respective coupling means, with diversion around the latter, and/or to an axial infeed of the coupling element axially to the respective coupling means. This can apply generally within the framework of the invention.

Figure 5A:
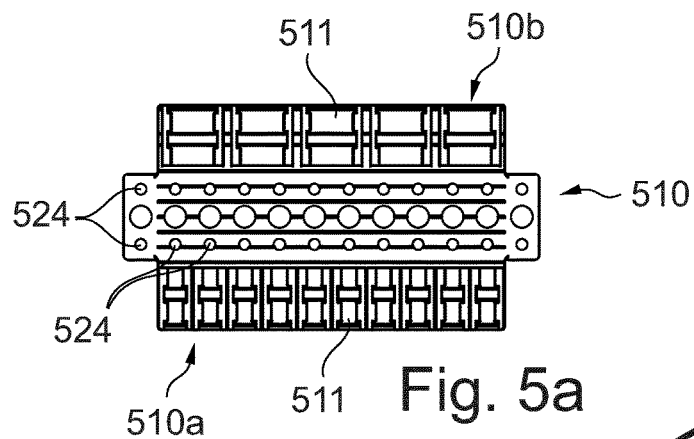
FIGS. 5a-5b: a yet further embodiment of a base body with coupling means and guide elements of a strain relief device according to the invention in a plan view (FIG. 5A) and in a perspective view (FIG. 5B)
Figure 5B:
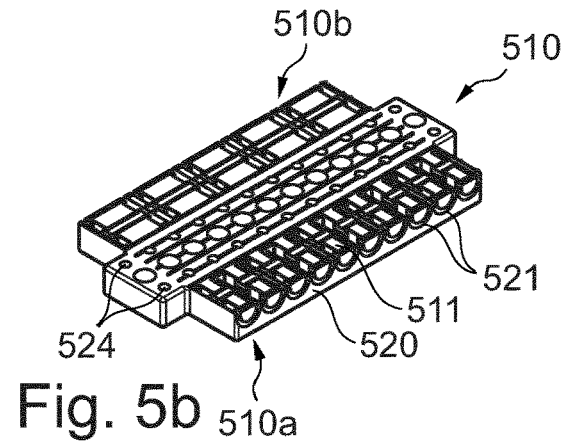

FIG. 5 shows a base body 510 in a modification of the base body 10 according to FIG. 1. The substantial differences will be described below, for the rest reference may be made comprehensively to the statements relating to FIGS. 1 and 2 and the other embodiment examples. In the case of the base body 510, the guide regions 521 of the guide element 520 are formed open on the front end, i.e. on the ends facing away from the central region. The gap or guide channel formed between the guide surfaces 521 and the coupling means 511 (see FIG. 1D), into which the coupling element 5 can be inserted, is thus open on the front end. The coupling element can hereby be inserted into the named gap in an axial direction in relation to the coupling means. Here, the coupling element can be formed or be arc-shaped with one portion, for example by manual deformation of an elongate coupling element, wherein the arc is preferably adapted in terms of its curvature to the cross-sectional contour of the gap or guide channel. For particular applications, an alternative or a simpler arrangement of the coupling element on the guide region is hereby made possible, for example depending on the design of the connection element of the line to be fixed to the respective coupling means 511. Here, the coupling element can also be formed substantially rigid. The region between the two coupling regions, following one another in the longitudinal direction of the coupling means, or the guide channel 23 is formed such that from the front end of the base body the coupling element 5 can be introduced into the (rear) guide channel facing away from the front end in the axial direction of the coupling means 511. However, the coupling element 5 is preferably selectively alternatively also positionable on the respective guide region laterally past the coupling means 11, as described with regard to FIG. 1, with the result that the handling of the coupling element is particularly flexible depending on the arrangement and formation of the respective line 50 and the connection element 50a thereof.

On its top side and/or on its bottom side the base body 510 has in each case fastening means 524, which serve to fix spacers 527, as correspondingly described with regard to the spacers 17 according to FIGS. 1, 2. Here, the fastening means 524 are arranged distributed over the longitudinal extent of the base body, as are—independently thereof—the fastening means for the fixing to the fastening means 16 according to FIG. 1. The base body can thus be cut to length, without loss of function. There is hereby a particularly favorable modular design.

Figure 6A:
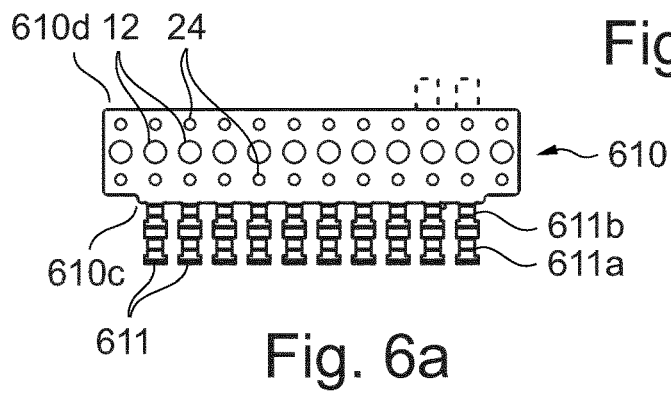
FIGS. 6a-6d: an embodiment of a base body with coupling means of a strain relief device according to the invention in a plan view (FIG. 6A) and in a perspective view (FIG. 6B), as well as a guide element, assigned to the base body according to FIGS. 6A, B, of the strain relief device in a plan view (FIG. 6C) and in a perspective view (FIG. 6D)
Figure 6B:
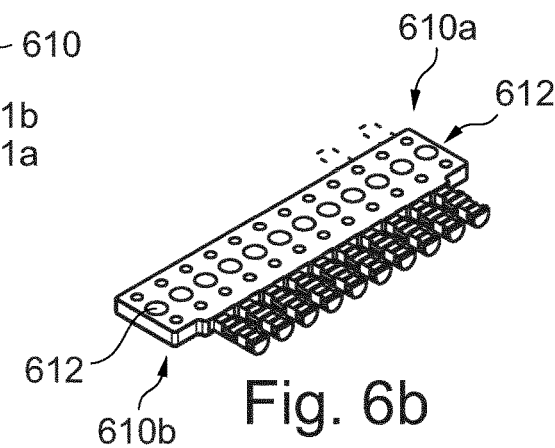
Figure 6C:
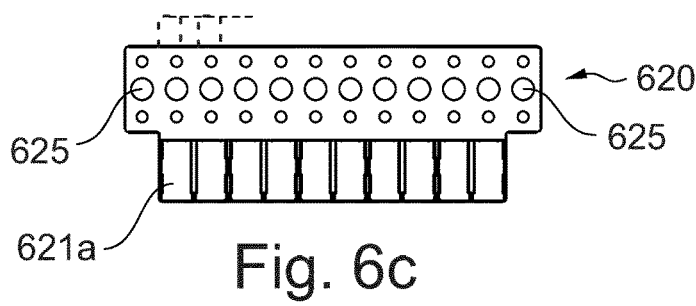
Figure 6D:
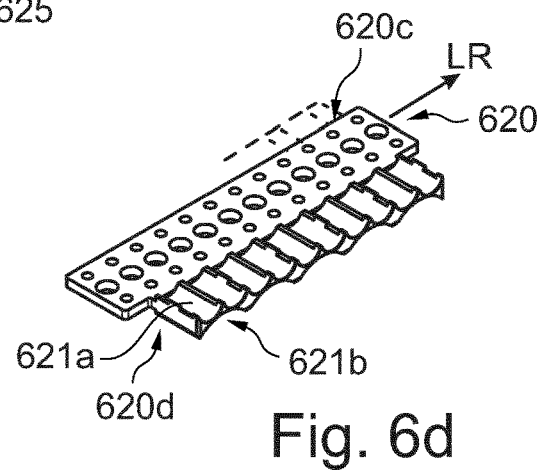
Figure 7B:
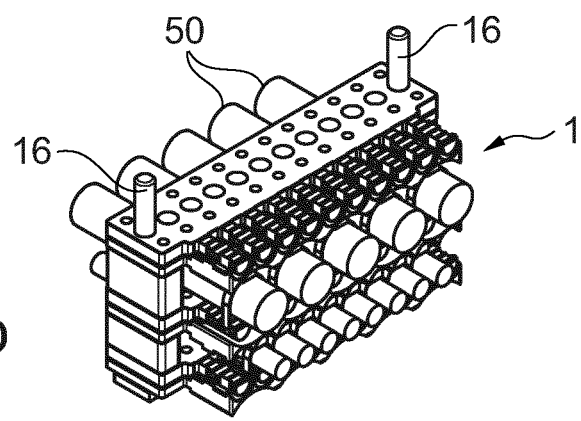
Figure 7C:
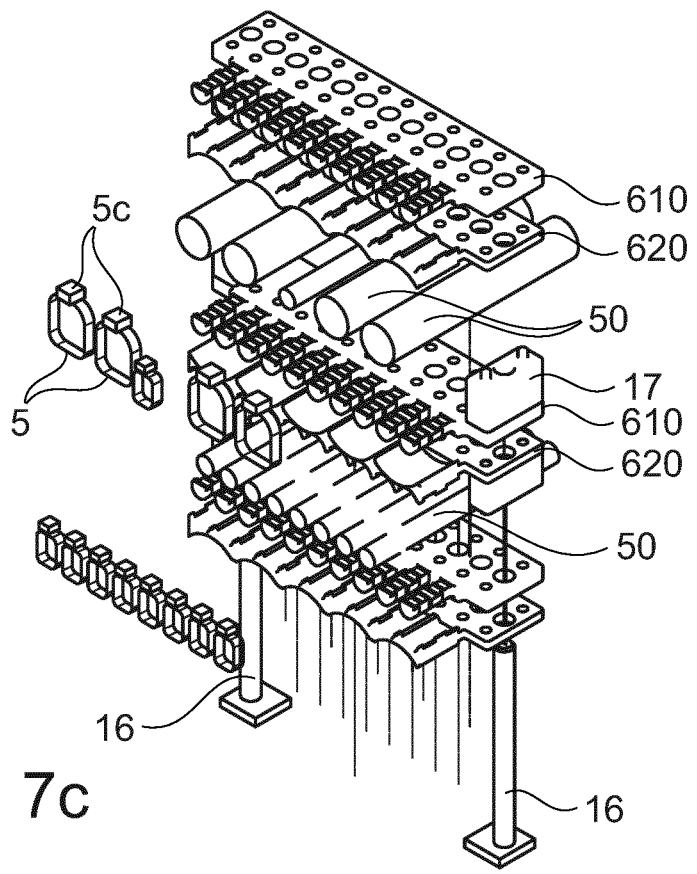

FIGS. 6, 7 show an embodiment example of a base body 610 with a guide element 620, formed as a separate component in relation thereto, with guide regions 621A and/or 621B, and a strain relief device 1 with such base bodies and guide elements. This design can correspondingly also be implemented in the case of all other embodiments of the embodiment examples. The base body 610 and the guide element 620 can, as represented, have coupling means 611 and guide regions 621A, B only on one of the lateral large surfaces, but these can in each case additionally also be provided on the other lateral large surface 610B (represented dashed), in each case in a different or identical configuration, as represented for example also in the case of the other embodiment examples. The coupling means 611 have portions 611a, 611b, spaced apart in the longitudinal direction thereof, for the arrangement of coupling elements 5 arranged one behind another, as correspondingly described with regard to FIGS. 1 and 5. The base body 610 and the guide element 620 are arrangeable one above the other on the strain relief device, as represented in FIG. 7. Here, the bottom side 610B of the base body can be arranged facing selectively the top and/or bottom side 620C of the guide element and can preferably rest against this, in particular over an area or over the full area. Here, the guide element 620 has fastening means 625, in order to be able to fasten the guide element 620 to the assigned base body 610 or relative thereto and/or in a tensile-force-absorbing and positionally fixed manner. The base body and the guide element are fastenable to the strain relief device in a tensile-force-absorbing and positionally fixed manner by means of the named fastening means, optionally also directly fastened to one another by suitable fastening means. The fastening means 625, corresponding also to the fastening means 612 of the base body 610, are here formed as through holes, through which for example a fastening element 16 can pass, as correspondingly described with regard to FIGS. 1 and 2. The base body and the guide elements are arranged stacked and preferably alternating with one another in the strain relief device (FIG. 7). According to FIG. 7, spacers 17 are arranged between respectively adjacent pairs of base bodies 610 and assigned guide elements 620, in order to be able to arrange lines 50 in the spacing hereby formed between adjacent arrangements of base body 610 and guide element 620, see correspondingly the statements relating to the others. The spacing elements 727 can optionally also be molded in one piece on the base body 610 and/or the guide element 620.

Guide regions 621A, B, which in each case have a different pitch (FIG. 6d, dashed) and/or are formed differently, are arranged on the guide element 620 on the top side 620A and the bottom side 620B thereof. The guide regions 621A of the top side 620C here have a smaller pitch than the guide regions 621B of the bottom side 620D, thus are arranged, corresponding to the smaller pitch, with a greater number per length unit of the guide element 620 in relation to its longitudinal direction LR (FIG. 6D). Here, the pitch of the guide regions 621A, B on the top and bottom side of the guide element corresponds to an integer divisor, according to the embodiment example the guide regions 621B on the bottom side extend over two guide regions 621A of the top side 620C of the guide element. This makes a selective fastening of the respective line to a different number of coupling means 11 possible, according to FIG. 7 for example selectively to one or to two coupling means for the different lines. However, said divisor of the guide regions on the top and bottom side of the guide element can generally optionally also be a non-integer divisor. The guide element 620 is arrangeable selectively with its top side 620A with guide regions 621A or else alternatively with its bottom side 620B with the guide regions 621B on or facing the bottom side 610B of the base body 610. Thus, depending on the position of the guide element 620, either the guide regions 621A of its top side (arrangement I according to FIG. 7a) or the guide regions 621B of its bottom side (arrangement II according to FIG. 7A) can be arranged facing the coupling means 611 of the base body 610, in order in each case to form between them a gap or guide channel for receiving the coupling element. According to arrangement I, the coupling element 5 arranged in a loop can thus, with fastening region 5A, fix a line 50, optionally with smaller diameter, to only one coupling means 611. According to arrangement II, owing to the different design of the guide regions 621B, the coupling element 5 can surround two, optionally also more, coupling means 611 in a loop together with one line, which here has a larger diameter, and fix these in a strain-relieving manner. According to arrangement II, a guide channel for the arrangement of the coupling element is formed between a guide region 621B and two coupling means 611. The guide regions 621a and 621b on the top and bottom side can alternatively or additionally also differ in terms of other features, for example depending on the arrangement of the guide element with its top or bottom side facing the base body 610 the gap or guide channel can have a different height, for example for the arrangement of coupling means with smaller or greater material thickness, which can apply generally within the framework of the invention. Through the formation of the guide element 620 and selective orientation relative to the base body, the strain relief device is hereby formed particularly flexible, in order to be able to fasten lines of different cross section or diameter to the strain relief device.

As illustrated in FIGS. 6A, B and 6C, D by dashed representation, on the respectively other lateral large surface 610B of base body 610 and/or guide element 620, further coupling means 611 or further guide regions 621 can also be provided, which can in each case have a different pitch and/or different design compared with the coupling means 611 and guide regions 621 of the respectively first large surface 610A, 620A. Here, the base body 610 is then preferably formed in order to be arranged, or to have been arranged in the strain relief device, selectively with one large surface 610A or the other large surface 610B facing the free end of the lines. In combination with this, the guide element 620 is formed in order to be arranged selectively with the guide regions arranged on one lateral large surface 620A or those arranged on the other lateral large surface 620B facing the free end of the line that is to be fastened or that is fastened to the strain relief device. A large number of different arrangements of a base body 610 with an assigned guide element 620 are hereby possible, in order to be able to fasten lines of different cross sections or diameters or mechanical load capacity to the respective base body. In the case of a given arrangement of the base body with the coupling means 611 arranged on a first lateral large surface 610, the assigned guide element 620 can be arranged with its top side 620A on the bottom side 610A of the base body, and here either with the guide regions arranged on the first large surface 620A or with the guide regions arranged on the other large surface 620B. Alternatively, the guide element 620 can be arranged in the case of the given arrangement of the base body 610 with its bottom side 621B facing the bottom side 610B of the base body, and here selectively either with the guide regions arranged on the first large surface 620A or those arranged on the second large surface 620B. Alternatively, the coupling means 611 arranged on the second lateral large surface 610B can be arranged facing the free line ends, wherein there are again the above-described four different possible arrangements of the guide element relative to the base body 610. The guide regions of a guide element 620 of a first large surface 620H on the top side and bottom side thereof, as well as the guide regions on the opposite large surface 620B on the top and bottom side of the guide element 620, can here in each case be formed differently, in particular with a different pitch and/or different width, position on the guide element for the dimensioning of the gap height or the like, in order to be particularly adapted to the line that is to be fixed or that is fixed in each case.

Figure 8A:
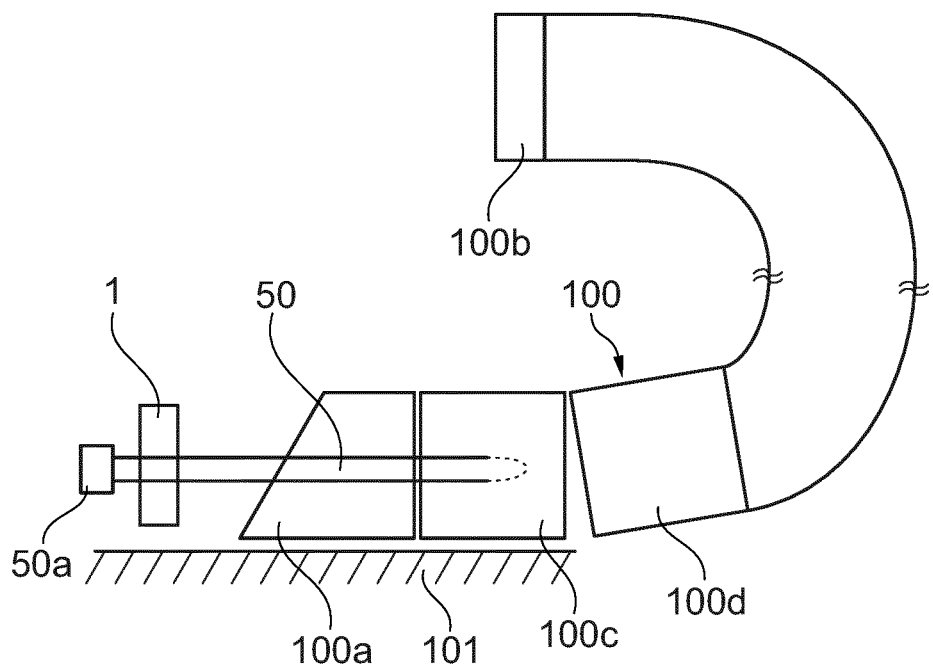
FIGS. 8a-8b: a schematic representation of a strain relief device according to the invention with line-guiding apparatus according to variant I with strain relief device according to the invention outside the line-guiding apparatus (FIG. 8A) and variant II with strain relief device according to the invention inside the line-guiding apparatus (FIG. 8B).
Figure 8B:
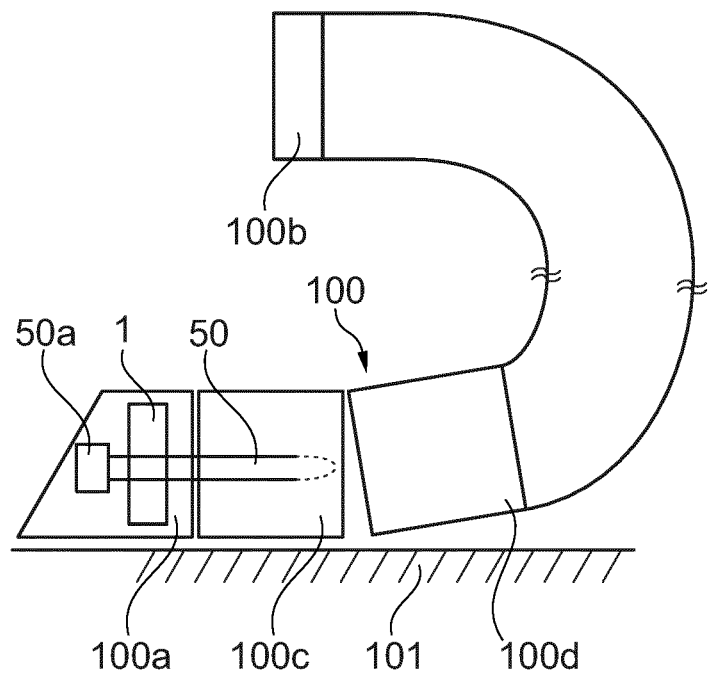

FIG. 8 shows a strain relief device 1 according to the invention with a line-guiding apparatus 100 which guides at least one or more lines 50 which are fastenable or fastened to the strain relief device 1 in a strain-relieving manner. The line 50 is formed in each case for the passage of a medium, such as a fluid, electrical current, information-transmitting medium or the like. The strain relief device 1 and the line-guiding apparatus 100 are represented in two different arrangements in FIGS. 8a and 8b. On its end regions the line 50 has in each case a connection part for the transfer of media to a consumer or supplier. The line-guiding apparatus 100 has a first and a second end region 100A, 100B, which are alterable in terms of position or movable relative to one another. Here, one of the two end regions 100A, 100B of the line-guiding apparatus can be fixed to an underlying surface 101, the other end region can be fixed to a movable consumer, but both end regions 100A, 100B can also be fastened to apparatuses that are movable relative to one another. The line-guiding apparatus 100 is here represented by way of example with the formation of a lower strand, an upper strand and a diverting region arranged between these, but it is not restricted to this and other relative alterations in position of the first and second end regions 100A, B relative to one another are also possible. The line-guiding apparatus 100 has several portions 100C, 100D which are alterable in terms of position relative to one another and which are connected to one another in an articulated manner.

According to FIG. 8A, the strain relief device 1 is arranged outside the line-guiding apparatus 100 and can here be fastened to an underlying surface 101, which can also be provided by a machine part, in a tensile-force-absorbing manner. According to FIG. 8B, the strain relief device 1 is arranged inside the line-guiding apparatus 100, according to the embodiment example inside the end region 100A thereof. The free line end 50A of the line 50 can be equipped in each case with a connection element for the media-transferring connection of the line to a supply apparatus.

What is claimed is:

1. A strain relief device for at least one or more supply lines, comprising:
   wherein the strain relief device is arrangeable or arranged on a line-guiding apparatus for guiding the at least one supply line, wherein the strain relief device has at least one base body, which comprises at least one coupling means for the strain-relieving fastening of the at least one supply line thereto and thus to the strain relief device,
   wherein at least one coupling element is provided, which is arrangeable peripherally surrounding the coupling means and the line to be fixed thereto and, in the state of the supply line fixed in a strain-relieving manner, surrounds the line in a loop together with the coupling means,
   wherein the base body has fastening means for the tensile-force-absorbing fastening thereof to at least one of the strain relief device or an underlying surface or another apparatus,
   wherein a guide element with a guide region for the coupling element is provided adjacent to the at least one coupling means for the strain-relieving coupling of the supply line, wherein the guide region is formed to guide the coupling element during a transfer of the coupling element from a position of the coupling element spaced apart from the coupling means into its position fastening the supply line to the coupling means in a strain-relieving manner,
   wherein
   (i) the guide region is formed in order, during an infeed of the coupling element laterally to and in the direction of the coupling means, to divert the coupling element, in interaction with the guide region, around the coupling means, with the result that the coupling element emerges from the guide region on this other side of the coupling means; or
   ii) the guide region is formed in order to guide the coupling element during an infeed of the coupling element axially in the direction of the coupling means; or
   iii) the guide region is formed in order, during an infeed of the coupling element laterally to and in the direction of the coupling means, to divert the coupling element, in interaction with the guide region, around the coupling means, with the result that the coupling element emerges from the guide region on this other side of the coupling means, and the guide region is formed in order to guide the coupling element during an infeed of the coupling element axially in the direction of the coupling means.

2. The strain relief device according to claim 1, wherein the guide region is formed in order, during an infeed of the coupling element, to divert the latter around the coupling means, with the result that the coupling element emerges from the guide region on the other side of the coupling means in relation to the infeed with a directional component which is opposed to the infeed direction of the coupling element.

3. The strain relief device according to claim 1, wherein the respective coupling means and the guide element with the guide region are arranged extending away from the central region of the base body.

4. The strain relief device according to claim 1, wherein the guide region of the guide element is formed arc-shaped with an arc inside curvature facing the assigned coupling means.

5. The strain relief device according to claim 1, wherein:
   the guide element comprises a guide channel for receiving and guiding the coupling element; or the guide element together with the coupling means assigned thereto forms a guide channel for the coupling element.

6. The strain relief device according to claim 1, wherein:
(i) the guide element and the coupling means are fastened to the base body in a material-bonding manner; or
(ii) the guide element is formed as a separate component in relation to the base body equipped with the coupling means.

7. The strain relief device according to claim 1, wherein several coupling means and guide elements assigned thereto in each case are arranged on the base body laterally spaced apart from one another, in a comb-like manner.

8. The strain relief device according to claim 1, wherein several guide regions are arranged on the guide element laterally spaced apart from one another, in a comb-like manner, in that the guide element is formed as a separate component in relation to the base body, and in that the guide element and the base body are arrangeable or arranged on the strain relief device in a stacked manner in relation to one another.

9. The strain relief device according to claim 8, wherein:
(i) the coupling means arranged on the two lateral large surfaces of the base body have a different pitch, or
(ii) the coupling means arranged on the two lateral large surfaces of the base body are formed differently, or
(iii) the coupling means arranged on the two lateral large surfaces of the base body have a different pitch and are formed differently.

10. The strain relief device according to claim 1, wherein the base body has two lateral large surfaces which, in the case of at least one line fixed to the strain relief device, run at least substantially perpendicular to the direction of extent of the line, and in that coupling means with guide regions assigned thereto are provided on the two large surfaces of the base body, wherein the guide regions are arranged on the base body or on a guide element separate therefrom.

11. The strain relief device according to claim 10, wherein:
(i) the coupling means arranged on the two lateral large surfaces of the base body have a different pitch, or
(ii) the coupling means arranged on the two lateral large surfaces of the base body are formed differently, or
(iii) the coupling means arranged on the two lateral large surfaces of the base body have a different pitch and are formed differently.

12. The strain relief device according to claim 11, wherein the base body is adapted in order to be fastenable or fastened to the strain relief device selectively with one of its two lateral large surfaces facing the free end of the at least one line.

13. The strain relief device according to claim 1, wherein guide regions are arranged on the two lateral large surfaces of the base body,
wherein the guide regions being arranged in the two lateral surfaces of the base body
(i) have a different pitch, or
(ii) are formed differently on the two lateral large surfaces, or
(iii) have a different pitch and are formed differently on the two lateral large surfaces.

14. The strain relief device according to claim 1, wherein the guide element is formed as a component that is separate from the base body, and in that the guide element is adapted to be fastenable or is fastened to the strain relief device selectively with one of its two lateral large surfaces facing the free end of the at least one line.

15. The strain relief device according to claim 1, wherein the guide element equipped with guide regions has a top side and a bottom side, in that the guide regions are arranged on the top side and on the bottom side of the guide element, and in that the guide element is formed as a component that is separate from the base body equipped with the coupling means and is fastenable or is fastened to the strain relief device selectively with its top side or with its bottom side facing the base body.

16. The strain relief device according to claim 15, wherein the guide element is formed such that:
(i) the pitch, or (ii) the design, or (iii) the pitch and the design of the guide regions on the top side and the bottom side of the guide element is different.

17. The strain relief device according to claim 15, wherein the guide element is formed such that:
(i) the pitch of the guide regions on the top side of the guide element, or
(ii) the pitch of the guide regions on the bottom side of the guide element, or
(iii) the pitch of the guide regions on the top side of the guide element and on the bottom side of the guide element
corresponds to an integer multiple of the pitch of the coupling elements of the base body assigned to the carrier element.

18. The strain relief device according to claim 1, wherein the strain relief device is constructed modularly, with:
(i) several base bodies stacked one above another and in that the base bodies are spaced apart from one another in the stacking direction by means of spacers in order, through the spacing, to form a receiving region for lines, or
(ii) several base bodies stacked one above another and guide elements arranged between adjacent base bodies, formed as separate components, and in that the base bodies are spaced apart from one another in the stacking direction by means of spacers in order, through the spacing, to form a receiving region for lines.

19. A line-guiding apparatus with the strain relief device according to claim 1.

20. A strain relief device for at least one or more supply lines, comprising:
wherein the strain relief device is arrangeable or arranged on a line-guiding apparatus for guiding the at least one supply line, wherein the strain relief device has at least one base body, which comprises at least one coupling means for the strain-relieving fastening of the at least one supply line thereto and thus to the strain relief device,
wherein at least one coupling element is provided, which is arrangeable peripherally surrounding the coupling means and the line to be fixed thereto and, in the state of the supply line fixed in a strain-relieving manner, surrounds the line in a loop together with the coupling means,
wherein the base body has fastening means for the tensile-force-absorbing fastening thereof to at least one of the strain relief device or an underlying surface or another apparatus,
wherein a guide element with a guide region for the coupling element is provided adjacent to the at least one coupling means for the strain-relieving coupling of the supply line, wherein the guide region is formed to guide the coupling element during a transfer of the coupling element from a position of the coupling element spaced apart from the coupling means into its position fastening the supply line to the coupling means in a strain-relieving manner, wherein the guide region of the guide element is formed arc-shaped with an arc inside curvature facing the assigned coupling means.

21. A strain relief device for at least one or more supply lines, comprising:

wherein the strain relief device is arrangeable or arranged on a line-guiding apparatus for guiding the at least one supply line, wherein the strain relief device has at least one base body, which comprises at least one coupling means for the strain-relieving fastening of the at least one supply line thereto and thus to the strain relief device, wherein at least one coupling element is provided, which is arrangeable peripherally surrounding the coupling means and the line to be fixed thereto and, in the state of the supply line fixed in a strain-relieving manner, surrounds the line in a loop together with the coupling means, wherein the base body has fastening means for the tensile-force-absorbing fastening thereof to at least one of the strain relief device or an underlying surface or another apparatus, wherein a guide element with a guide region for the coupling element is provided adjacent to the at least one coupling means for the strain-relieving coupling of the supply line, wherein the guide region is formed to guide the coupling element during a transfer of the coupling element from a position of the coupling element spaced apart from the coupling means into its position fastening the supply line to the coupling means in a strain-relieving manner, wherein
the guide element comprises a guide channel for receiving and guiding the coupling element; or
the guide element together with the coupling means assigned thereto forms a guide channel for the coupling element.

22. A strain relief device for at least one or more supply lines, comprising:

wherein the strain relief device is arrangeable or arranged on a line-guiding apparatus for guiding the at least one supply line, wherein the strain relief device has at least one base body, which comprises at least one coupling means for the strain-relieving fastening of the at least one supply line thereto and thus to the strain relief device, wherein at least one coupling element is provided, which is arrangeable peripherally surrounding the coupling means and the line to be fixed thereto and, in the state of the supply line fixed in a strain-relieving manner, surrounds the line in a loop together with the coupling means, wherein the base body has fastening means for the tensile-force-absorbing fastening thereof to at least one of the strain relief device or an underlying surface or another apparatus, wherein a guide element with a guide region for the coupling element is provided adjacent to the at least one coupling means for the strain-relieving coupling of the supply line, wherein the guide region is formed to guide the coupling element during a transfer of the coupling element from a position of the coupling element spaced apart from the coupling means into its position fastening the supply line to the coupling means in a strain-relieving manner, wherein several guide regions are arranged on the guide element laterally spaced apart from one another, in a comb-like manner, in that the guide element is formed as a separate component in relation to the base body, and in that the guide element and the base body are arrangeable or arranged on the strain relief device in a stacked manner in relation to one another.

23. A strain relief device for at least one or more supply lines, comprising:

wherein the strain relief device is arrangeable or arranged on a line-guiding apparatus for guiding the at least one supply line, wherein the strain relief device has at least one base body, which comprises at least one coupling means for the strain-relieving fastening of the at least one supply line thereto and thus to the strain relief device, wherein at least one coupling element is provided, which is arrangeable peripherally surrounding the coupling means and the line to be fixed thereto and, in the state of the supply line fixed in a strain-relieving manner, surrounds the line in a loop together with the coupling means, wherein the base body has fastening means for the tensile-force-absorbing fastening thereof to at least one of the strain relief device or an underlying surface or another apparatus, wherein a guide element with a guide region for the coupling element is provided adjacent to the at least one coupling means for the strain-relieving coupling of the supply line, wherein the guide region is formed to guide the coupling element during a transfer of the coupling element from a position of the coupling element spaced apart from the coupling means into its position fastening the supply line to the coupling means in a strain-relieving manner, wherein the base body has two lateral large surfaces which, in the case of at least one line fixed to the strain relief device, run at least substantially perpendicular to the direction of extent of the line, and in that coupling means with guide regions assigned thereto are provided on the two large surfaces of the base body, wherein the guide regions are arranged on the base body or on a guide element separate therefrom.

24. A strain relief device for at least one or more supply lines, comprising:

wherein the strain relief device is arrangeable or arranged on a line-guiding apparatus for guiding the at least one supply line, wherein the strain relief device has at least one base body, which comprises at least one coupling means for the strain-relieving fastening of the at least one supply line thereto and thus to the strain relief device, wherein at least one coupling element is provided, which is arrangeable peripherally surrounding the coupling means and the line to be fixed thereto and, in the state of the supply line fixed in a strain-relieving manner, surrounds the line in a loop together with the coupling means, wherein the base body has fastening means for the tensile-force-absorbing fastening thereof to at least one of the strain relief device or an underlying surface or another apparatus, wherein a guide element with a guide region for the coupling element is provided adjacent to the at least one coupling means for the strain-relieving coupling of the supply line, wherein the guide region is formed to guide the coupling element during a transfer of the coupling element from a position of the coupling element spaced apart from the coupling means into its position fastening the supply line to the coupling means in a strain-relieving manner, wherein the guide element equipped with guide regions has a top side and a bottom side, in that the guide regions are arranged on the top side and on the bottom side of the guide element, and in that the guide element is formed as a component that is separate from the base body equipped with the coupling means and is fastenable or is fastened to the strain relief device selectively with its top side or with its bottom side facing the base body.

25. A strain relief device for at least one or more supply lines, comprising:

wherein the strain relief device is arrangeable or arranged on a line-guiding apparatus for guiding the at least one supply line, wherein the strain relief device has at least one base body, which comprises at least one coupling means for the strain-relieving fastening of the at least one supply line thereto and thus to the strain relief device, wherein at least one coupling element is provided, which is arrangeable peripherally surrounding the coupling means and the line to be fixed thereto and, in the state of the supply line fixed in a strain-relieving manner, surrounds the line in a loop together with the coupling means, wherein the base body has fastening means for the tensile-force-absorbing fastening thereof to at least one of the strain relief device or an underlying surface or another apparatus, wherein a guide element with a guide region for the coupling element is provided adjacent to the at least one coupling means for the strain-relieving coupling of the supply line, wherein the guide region is formed to guide the coupling element during a transfer of the coupling element from a position of the coupling element spaced apart from the coupling means into its position fastening the supply line to the coupling means in a strain-relieving manner, wherein the strain relief device is constructed modularly, with several base bodies stacked one above another and in that the base bodies are spaced apart from one another in the stacking direction by means of spacers in order, through the spacing, to form a receiving region for lines.

26. The strain relief device according to claim 25, wherein guide elements are arranged between adjacent base bodies, formed as separate components.

* * * * *